US006324185B1

(12) United States Patent
Budhraja

(10) Patent No.: US 6,324,185 B1
(45) Date of Patent: Nov. 27, 2001

(54) METHOD AND APPARATUS FOR SWITCHING AND MANAGING BANDWIDTH IN AN ATM/TDM NETWORK CROSS-CONNECTION

(75) Inventor: Virendra K. Budhraja, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/208,626

(22) Filed: Dec. 8, 1998

(51) Int. Cl.[7] ........................................................ H04J 3/16
(52) U.S. Cl. ............................ 370/468; 370/400; 370/395
(58) Field of Search .................................... 370/230, 235, 370/238, 252, 352, 355, 356, 357, 389, 395, 396, 397, 401, 400, 409, 465, 468, 477

(56) References Cited

U.S. PATENT DOCUMENTS

| 5,166,927 | * | 11/1992 | Iida et al. ............................ 370/238 |
| 5,274,635 | | 12/1993 | Rahman et al. ..................... 370/60.1 |
| 5,483,522 | * | 1/1996 | Derby et al. ........................ 370/400 |
| 5,627,971 | * | 5/1997 | Miernik ............................... 370/238 |
| 5,777,988 | * | 7/1998 | Cisneros ............................. 370/238 |
| 5,790,546 | * | 8/1998 | Dobbins et al. .................... 370/400 |
| 5,940,372 | * | 8/1999 | Bertin et al. ........................ 370/238 |
| 6,141,318 | * | 10/2000 | Miyao .................................. 370/217 |

OTHER PUBLICATIONS

"Digital Interface Between the SLC®96 Digital Loop Carrier System And a Local Digital Switch," Technical Reference TR–TSY–000008, Issue 2, Aug., 1987, Revision 1, Sep., 1993, *Bellcore*.

"Functional Criteria for Digital Loop Carrier Systems," A Module of TSGR, FR–NWT–000440, Technical Reference TR–NWT–000057, Issue 2, Jan., 1993, *Bellcore*.

"Integrated Services Digital Networks (ISDN) Overall Network Aspects and Functions Functional Architecture of Transport Networks Based on ATM," ITU–T Recommendation 1.326, *International Telecommunication Union*, Nov., 1995, 23 pages.

"Integrated Digital Loop Carrier System Generic Requirements, Objectives, and Interface," (A module of TSGR, FR–440), Generic Requirements GR–303–CORE, Issue 2, *Bellcore*, Dec., 1998.

\* cited by examiner

*Primary Examiner*—Ricky Ngo
*Assistant Examiner*—Phuc Tran
(74) *Attorney, Agent, or Firm*—Baker Botts L.L.P.

(57) ABSTRACT

An ATM/TDM cross-connection in a digital loop carrier (DLC) network providing switching and bandwidth management facilities. TDM traffic is encapsulated in ATM cells and transported from network terminations to subscriber terminations in a digital loop via a plurality of digital loop carrier switching systems (DLCSSs). The DLCSSs are configured such that TDM traffic encapsulated in ATM cells may be transported from the network termination to the subscriber termination without having to perform TDM switching at the intermediate DLCSSs.

12 Claims, 6 Drawing Sheets

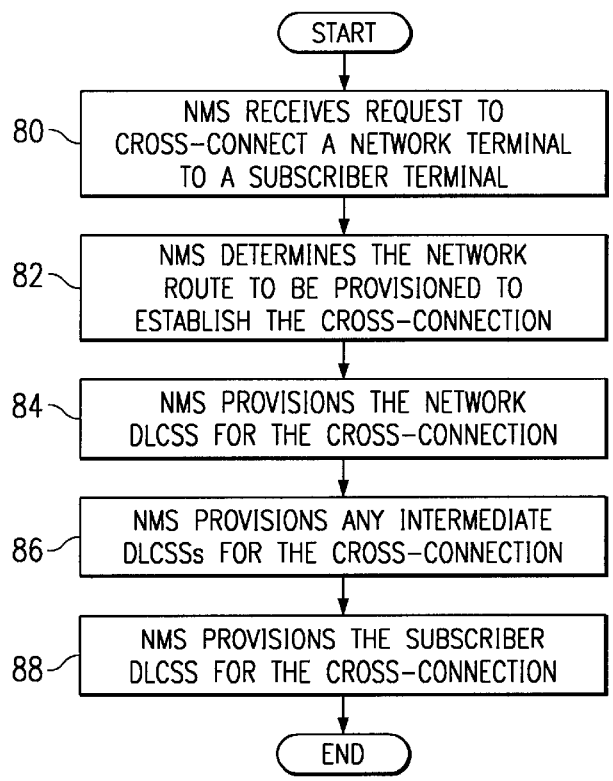
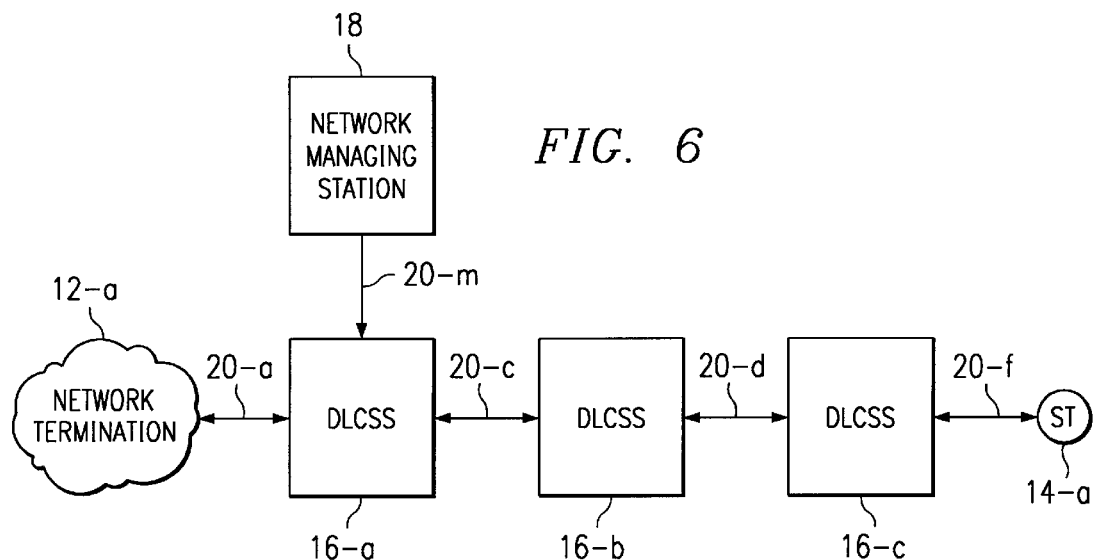

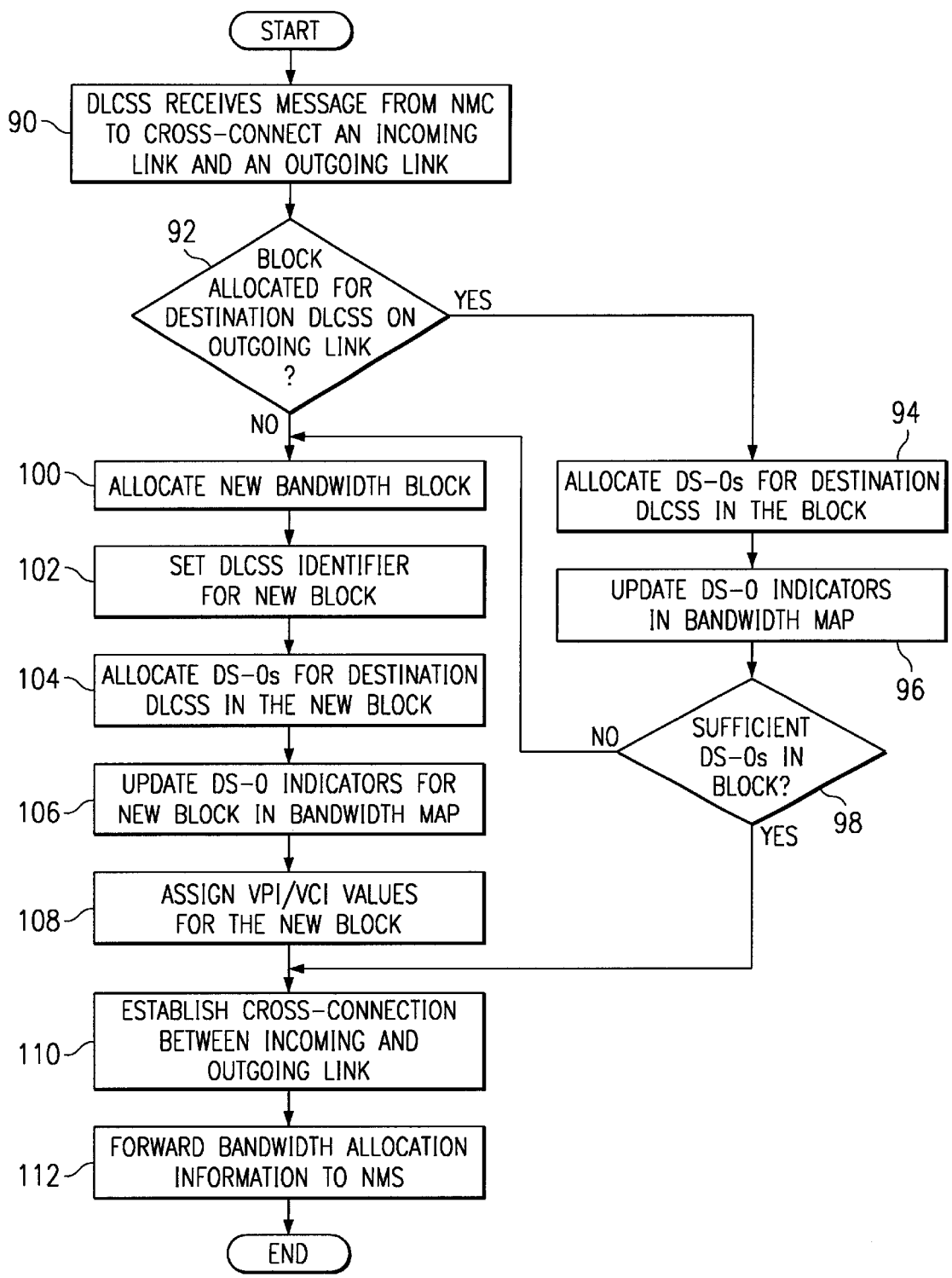

METHOD AND APPARATUS FOR SWITCHING AND MANAGING BANDWIDTH IN AN ATM/TDM NETWORK CROSS-CONNECTION

BACKGROUND OF THE INVENTION

This invention relates to digital loop carrier (DLC) technology and in particular to techniques for cross-connecting ATM and TDM networks having subscriber terminations and network terminations. More particularly, the invention relates to ATM/TDM cross-connection techniques in a particular class of networks employing a plurality of multi-service digital local loop switching systems, such as B-32 switches manufactured by Fibex Systems of Petaluma, Calif.

Time division Multiplex (TDM) traffic can be carried in Asynchronous Transfer Mode (ATM) in certain portions of a standard transport network. Heretofore, routing such traffic has required that the TDM traffic datagrams be routed at each switching node within the ATM network. Further, it was required that a virtual path identifier/virtual circuit identifier pair for an ATM circuit (VPI/VCI) for each ATM cell be provided for each path at the time of attempted cross connect. As a result of the above, establishing cross-connections between ATM and TDM networks is usually a slow and resource-intensive process. It is desirable to reduce the amount of switching and delay in a network with multiple intermediate nodes.

Thus, there is a need for a system and method which provides a better and efficient mechanism for establishing a digital cross-connection between ATM networks and TDM networks, and which reduces the processing and time overhead associated with switching ATM and TDM traffic in the cross-connection.

SUMMARY OF THE INVENTION

According to the present invention, a system and method are disclosed for cross-connecting ATM and TDM networks by provisioning a network connection between a network terminal and a subscriber terminal in a digital loop carrier network comprising a plurality of digital loop carrier switching systems (DLCSSs). The DLCSSs may be configured such that the TDM traffic encapsulated in ATM cells may be transported from the network termination to the subscriber termination without having to perform TDM switching at the intermediate DLCSSs.

According to another aspect of the present invention, to facilitate bandwidth management for the network, the DLCSSs maintain bandwidth maps for each of their links. The bandwidth maps define the bandwidth and switching characteristics for the DLCSS links. The bandwidth maps enable switching of ATM cells carrying the TDM payload without having to perform TDM switching at the intermediate DLCSSs.

According to yet another aspect of the present invention, ATM cells for carrying TDM traffic are allocated according to information stored in the bandwidth maps. All the DS-0s in an ATM cell are allocated to the same destination which obviates the need to perform TDM switching at the intermediate network nodes.

According to still another aspect of the present invention, a network managing station is provided to facilitate provisioning of the ATM/TDM cross connection. The network managing station may be configured to determine the network route between the network termination and the subscriber termination to provision the DLCSSs and links in the network route.

BRIEF DESCRIPTION OF THE DRAWINGS

Additional objects and features of the invention will be more readily apparent from the following detailed description and appended claims when taken in conjunction with the drawings, in which:

FIG. 5 is a flowchart depicting the steps for provisioning a cross-connection between network termination and subscriber termination according to an embodiment of the invention.

FIG. 6 is a block diagram depicting a subset of the DLC network depicted FIG. 1, showing the network route to be provisioned to establish a cross-connection between a network termination and a subscriber termination.

FIG. 7 is a flowchart depicting the steps for configuring a DLCSS to support the ATM/TDM cross-connection.

DESCRIPTION OF THE SPECIFIC EMBODIMENTS

Figure 1:
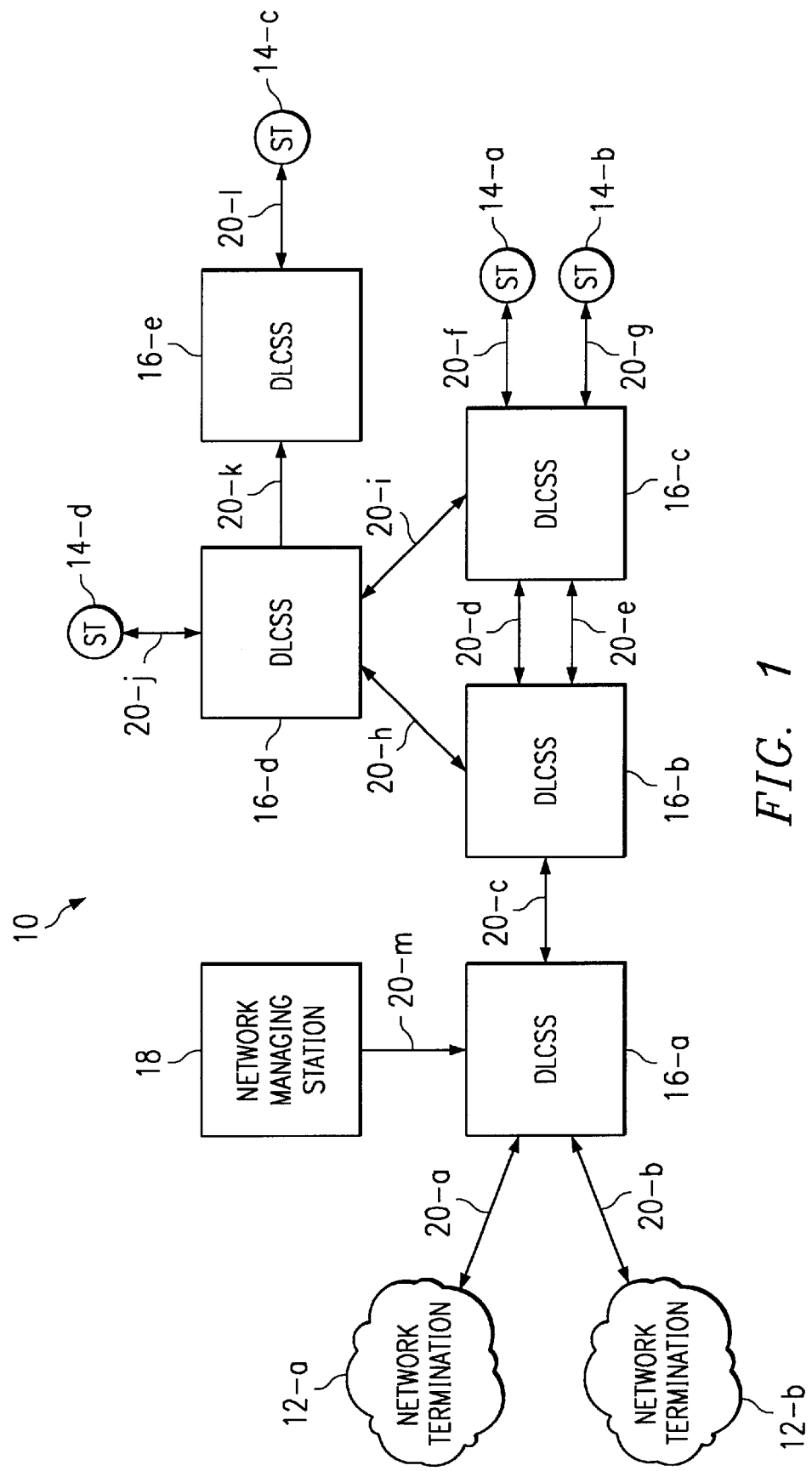
FIG. 1 is a high level block diagram of a DLC network according to an embodiment of the invention.

The present invention is a system and method for establishing cross-connections between TDM and ATM networks and providing switching and bandwidth management facilities for the TDM/ATM cross-connection in a digital loop carrier (DLC) network. FIG. 1 is a high level block diagram of a DLC network 10 comprising a plurality of multi-service digital local carrier switching systems (DLCSS) 16-a, 16-b, 16-c, 16-d, 16-e, one or more network terminations 12-a, 12b coupled to DLCSS 16-a, one or more subscriber terminations 14-a through 14-d coupled to one or more DLCSSs 16, and at least one network managing station (NMS) 18 coupled to a DLCSS 16-a. The various components are coupled to each other via network links 20-a through 20-m. As shown in FIG. 1, network terminations 12-a and 12-b may be coupled to subscriber terminations 14-a through 14-d to provide network based services to the subscribers.

The network shown in FIG. 1 may be any standard transport network such as a Synchronous Optical network (SONET) or an ATM network. Network terminations 12-a and 12-b as shown in FIG. 1 may include analog line terminations providing analog connection pairs, DS-0 channel terminations providing DS-0 based network connections, DS-1 line terminations providing DS-1 based network connections, Integrated Services digital Network (ISDN) Basic Rate Interface (BRI) line terminations providing universal BRI connections, ISDN quarter DS-0 channel terminations providing QDS-0 connections, XDSL line terminations, DS-1 UNI terminations providing DS-1 UNI services, OC-3 UNI terminations providing OC-3 UNI services, DS-1 circuit emulation terminations providing DS-1 CES, or any other similar terminations known to those of ordinary skill in the art. The network connections 20-a and 20-b may themselves be physical interfaces, for example, a DS-1 line interface to a Class-5 switch, or may be part of a bigger network pipe, for example, a DS-0 channel termination which is part of a DS-1 line termination.

The present invention supports a wide variety of subscriber terminations such as analog line terminations providing DS-0 based analog services such as POTS, E&M, etc., ISDN BRI line terminations providing ISDN BRI services such as 2B+D service, ISDN DS-0 channel terminations providing ISDN B channel services, ISDN quarter DS-0 channel terminations for subscriber signaling, DS-1 line terminations providing TDM DS-1 services, ISDN PRI line terminations providing ISDN PRI services such as 23B+D service, XDSL line terminations, DS-1 UNI terminations providing DS-1 UNI services, OC-3 UNI terminations providing OC-3 UNI services, DS-1 circuit emulation terminations providing DS-1 CES, or any other similar terminations known to those of ordinary skill in the art. Table 1 shows some of the valid cross-connections which may possibly be made between network terminations 12-*a*, 12-*b* and subscriber terminations 14-*a*, 14-*b*, 14-*c*, and 14-*d*.

TABLE 1

| Network Terminations | Subscriber Terminations | Services supported |
| --- | --- | --- |
| DS-0 channel | Analog line | TR008 services |
| Analog line | Analog line | Universal analog services |
| DS-0 channel | DS-0 channel | ISDN services |
| QDS-0 channel | QDS-0 channel | ISDN signaling |
| DS-1 line | DS-1 line | DS-1 link and services |
| XDSL line | XDSL line | XDSL services |
| DS-1 UNI | DS-1 UNI | DS-1 UNI services |
| OC-3 UNI | OC-3 UNI | OC-3 UNI services |

Multi-service DLCSSs 16 are primarily responsible for establishing a cross-connection between ATM and TDM networks and for providing switching and bandwidth management services for the cross-connection. Based on the location of a DLCSS within the network topology, a DLCSS may be classified as a "network" DLCSS, an "intermediate" DLCSS, or a "subscriber" DLCSS. A "network" DLCSS is one which interfaces with at least one network termination. For example, in FIG. 1, DLCSS 16-*a* which interfaces with network terminations 12-*a* and 12-*b* may be classified as a network DLCSS. In addition to a network termination interface, a network DLCSS may also have interfaces to subscriber terminations. A "subscriber" DLCSS is one which interfaces with at least one subscriber termination but does not interface with a network termination. For example, DLCSSs 16-*c*, 16-*d*, and 16-*e* which interface with subscriber terminations 14-*a* and 14-*b*, 14-*d*, and 14-*e*, respectively, may be referred to as subscriber DLCSSs. DLCSSs which are neither network DLCSSs nor subscriber DLCSSs are classified as intermediate DLCSSs. For example, DLCSS 16-*b* may be referred to as an intermediate DLCSS. It should be noted that the classification of DLCSSs as described above is solely for the purpose of explaining the working of the present invention and should not be construed in any manner to limit the scope of the present invention.

In a specific embodiment, NMS 18 allows a network administrator to provision the network to support the ATM/TDM cross-connection. NMS 18 is typically coupled with a network DLCSS, such as 16-*a*. Functions performed by NMS 18 include but are not restricted to: network configuration, configuring the DLCSSs and their associated links to establish a connection between a network termination and a subscriber termination, network management functions, and monitoring and logging of alarms or errors raised within the network.

Figure 2:
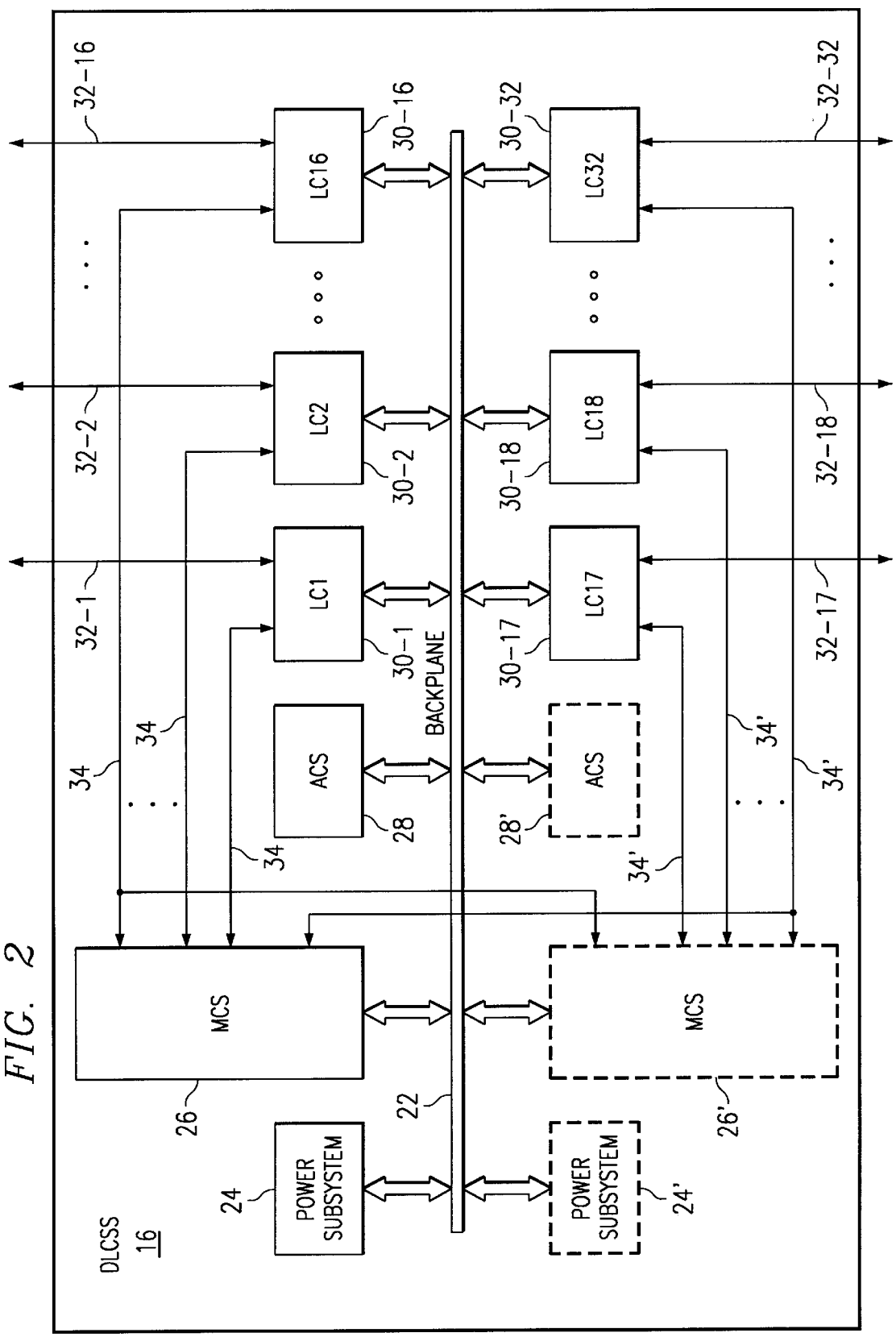
FIG. 2 is a block diagram of a multi-service digital loop carrier switching system (DLCSS) according to an embodiment of the invention.

FIG. 2 illustrates a specific embodiment of DLCSS 16. As shown in FIG. 2, DLCSS 16 comprises a plurality of components and subsystems connected to a backplane 22. Backplane 22 provides a mechanism for letting the various components and subsystems of DLCSS 16 communicate with each other as intended. The subsystems may include a power subsystem 24, a main controller subsystem (MCS) 26, an advanced controller subsystem (ACS) 28, and a plurality of line cards (LCs) 30–1 through 30–16. In a specific embodiment, a redundant set of subsystems 24', 26', and 28' may also provided to back up the primary subsystems. An additional set of line cards 30–17 through 30–32 may also be provided to increase the bandwidth capacity of DLCSS 16. When a redundant set of subsystems is provided, each line card is directly coupled both to primary MCS 26 and to redundant MCS 26'.

Power subsystem 24 provides power to the subsystems of DLCSS 16. MCS 26 is primarily responsible for establishing the ATM/TDM cross-connection and for providing switching and bandwidth management services for the cross-connection. ACS 28 is responsible for providing advanced network related functions such as supporting high capacity ATM switches which may support bandwidhths in excess of 10 Gigabit, supporting frame relay switches and IP switching.

In a specific embodiment, line cards 30–1 through 30–16 (and 30–17 through 30–32 of the additional LCs) may be configured to couple DLCSS 16 to other components of the network via links 32–1 through 32–32. The other components of the network may include other DLCSSs, network terminations, subscriber terminations, or network managing stations. In a specific embodiment, each line card is directly coupled to MCS 26 via connections 34. In embodiments which support redundant subsystems, the line cards may be coupled to both primary MCS 26 and to the redundant MCS 26'. A line card link may either carry incoming traffic from external network components to DLCSS 16 (ingress), or may alternatively carry outgoing network traffic from DLCSS 16 to external network components (egress). Connections 34 facilitate the transfer of incoming network traffic from the line cards to MCS 26, and transfer of outgoing traffic from MCS 26 to external network components after switching and bandwidth management has been performed by MCS 26.

Figure 3:
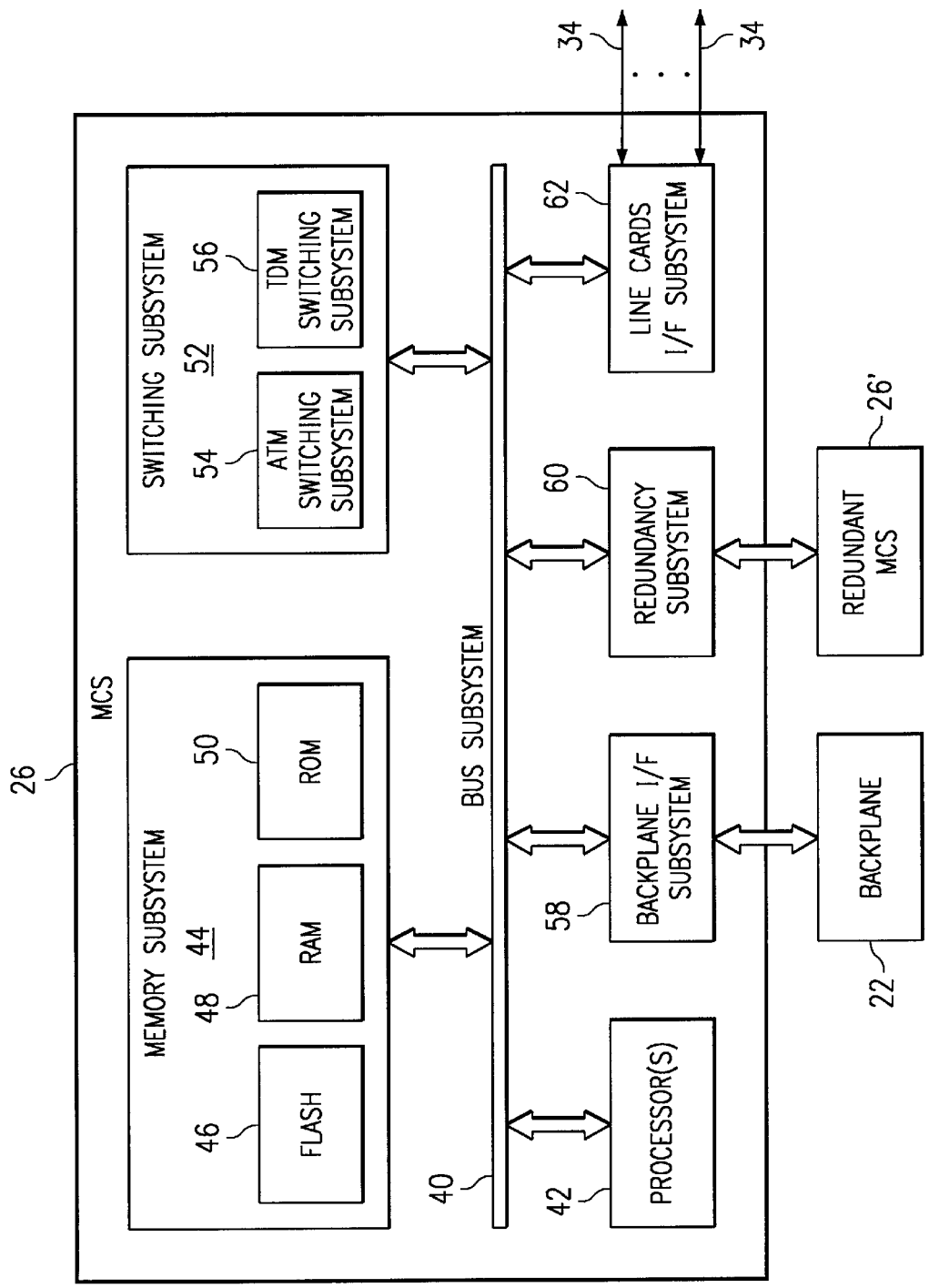
FIG. 3 is a block diagram of the main control subsystem which is contained within a DLCSS according to an embodiment of the invention.

FIG. 3 illustrates a specific embodiment of MCS 26. MCS 26 is primarily responsible for providing switching and bandwidth management functions to support the ATM/TDM cross-connection. As shown in FIG. 3, MCS 26 includes at least one processor 42 which communicates with a number of peripheral subsystems via bus subsystem 40. These peripheral subsystems typically include a memory subsystem 44, a switching subsystem 52, a line cards interface subsystem 62, a backplane interface subsystem 58, and optionally a redundancy subsystem 60.

Bus subsystem 40 provides a mechanism for letting the various components and subsystems of MCS 26 communicate with each other as intended. Bus subsystem 40 is shown schematically as a single bus, but a typical system may have a number of buses such as a local bus and one or more expansion buses as well as serial and parallel ports.

Memory subsystem 44 stores the various data constructs and programming modules that provide the functionality of MCS 26. Memory subsystem 44 typically includes a number of memories including a main random access memory (RAM) 48 for storage of instructions and data during program execution, a read only memory (ROM) 50 in which fixed instructions are stored, and a FLASH memory 46 which stores a mirror image of the various programming module images and databases stored in RAM 48. FLASH memory 46 thus provides persistent storage of the contents of RAM 48 and prevents the RAM contents from being lost due to loss of power to RAM 48. In a specific embodiment, a background process initiated by MCS 26 copies contents of RAM 48 to FLASH memory 46 while a foreground process continues to perform processing based on the contents of RAM 48. Memory subsystem 44 may store both static data and dynamic data. Static data is generally data related to the provisioning of the DLCSS by NMS 18 and does not change until the DLCSS is re-provisioned by NMS 18. Dynamic data may change during the operation of the network depending on the status of various hardware and software components within network system 10.

Switching subsystem 52 may comprise an ATM switching subsystem 54 and a TDM switching subsystem 56 and performs ATM/TDM cross-connection switching functions. Line cards interface subsystem 62 provides linkage for each of the line card links 32–1 through 32–32. MCS 26 receives incoming network traffic via these links, performs switching of the incoming network traffic, and transfers the network traffic to outgoing links for transportation to other components of the network.

Backplane interface subsystem 58 provides a mechanism for connecting MCS 26 to backplane 22. Backplane interface subsystem 58 may also be configured to handle communication of information/signals between MCS 26 and the other subsystems of DLCSS 16 via backplane 22.

In a specific embodiment which provides redundant subsystems, a redundancy subsystem 60 is provided for interfacing primary MCS 26 with redundant MCS 26'. Redundancy subsystem 60 may be configured to manage switch-over operations from primary MCS 26 to redundant MCS 26' when primary MCS 26 is disabled.

In order to establish a cross-connection between a network termination and a subscriber termination, for example between network termination 12-a and subscriber termination 14-a in FIG. 1, the egress and ingress links of all DLCSSs in the path between network termination 12-a and subscriber termination 14-a have to be configured to support the cross-connection. To facilitate the cross-connection, each DLCSS maintains a bandwidth map for each of its links. The bandwidth map defines the bandwidth allocation for the particular associated link. In a specific embodiment, the bandwidth map is stored in memory subsystem 44 of MCS 26. The bandwidth map may be updated by programming modules and data constructs stored in memory subsystem 44 and executed by processor 42 or by other subsystems of MCS 26.

Figure 4:
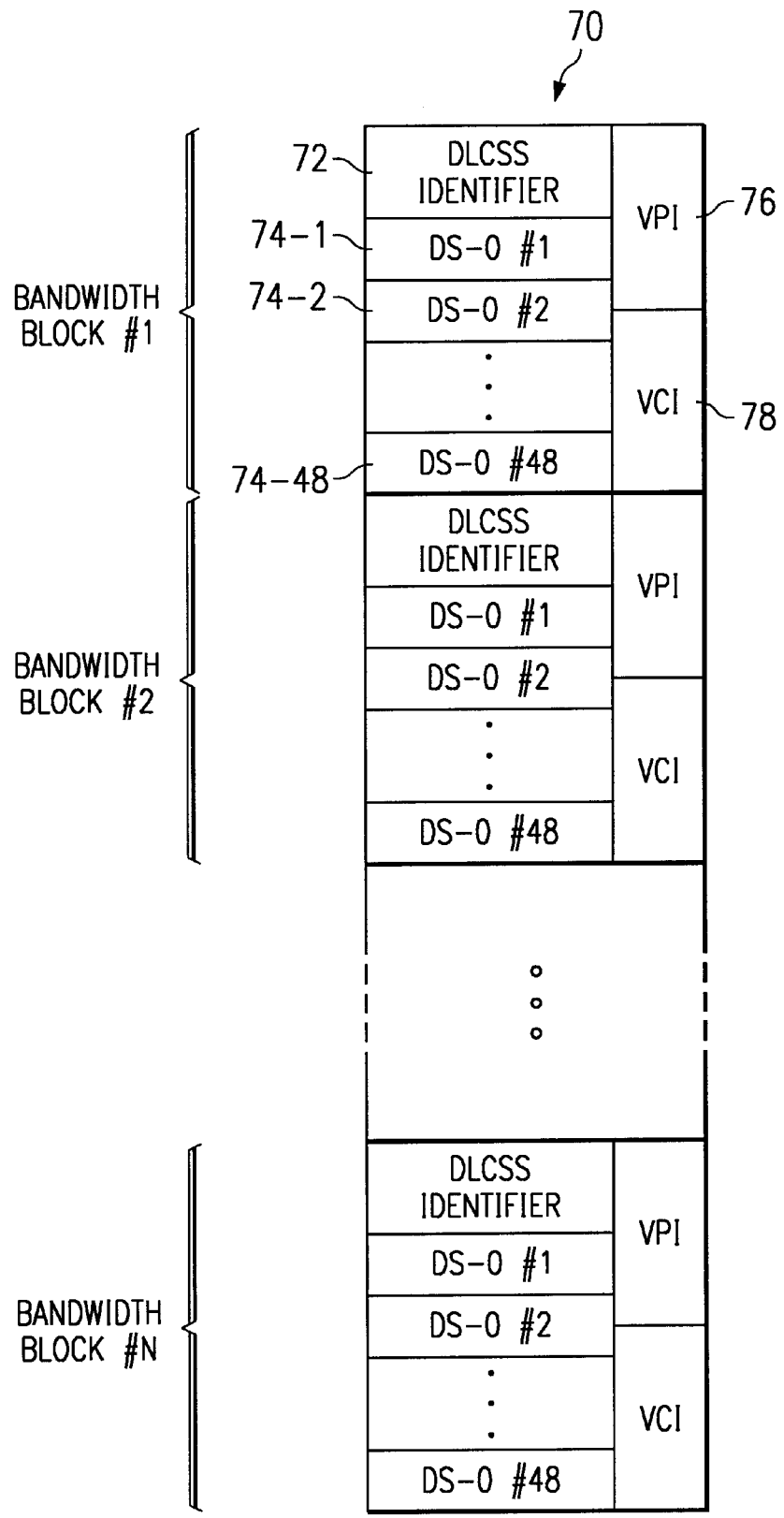
FIG. 4 depicts a control data structure implementing the bandwidth map stored in the memory subsystem of a DLCSS for each link supported by the DLCSS according to an embodiment of the invention.

FIG. 4 depicts a specific embodiment of bandwidth map 70 which is stored by a DLCSS for each link connected to the DLCSS. As shown, bandwidth map 70 comprises a plurality of bandwidth blocks. Each bandwidth block corresponds to an ATM cell and determines the bandwidth and switching parameters for the ATM cell. Each bandwidth block may contain several sub-fields including a DLCSS identifier field 72, 48 DS-0 indicators 74–1 through 74–48, a VPI field 76, and a VCI field 78.

DLCSS identifier field 72 stores an identifier identifying the subscriber DLCSS which is connected to the subscriber termination to be cross-connected to the network termination and to which the ATM cell corresponding to the bandwidth block is to be routed. For example, if a DLCSS bandwidth block were configured to support a cross connection between network termination 12-a and subscriber termination 14-a, as shown in FIG. 1, DLCSS identifier field 72 would store the identifier of DLCSS 16-c. The DLCSS identifier is assigned dynamically at cross-connection time and supplied by NMS 18. Once a DLCSS identifier has been assigned to a bandwidth block, all the DS-0s within that bandwidth block are exclusively assigned to the DLCSS identified by the DLCSS identifier and cannot be assigned to another DLCSS. This allows TDM traffic, represented by the 48 DS-0s in the ATM cell, to be routed from a network termination to a subscriber termination without needing TDM switching through the time-slot interchange (TSI) at the intermediate DLCSSs.

There are typically 48 DS-0 indicators in each bandwidth block corresponding to 48 DS-0s supported by an ATM cell, wherein each DS-0 is 1 byte (or 8 bits) wide. The DS-0 indicators are generally one bit values and indicate whether the corresponding DS-0 in an ATM cell has been allocated for transmission. Thus, in a specific embodiment a DS-0 indicator #22 having a bit value of "1" may indicate that DS-0#22 in the ATM cell has been allocated.

The use of VPI and VCI values is well known to those skilled in the art. According to the ATM standard, each ATM communication link may be comprise a number of virtual paths (VPs), and each virtual path may in turn comprise a number of virtual channels (VCs). A VPI value indicates a particular virtual path within the physical communication link, while a VCI value indicates a particular virtual channel within the particular virtual path. VPI and VCI fields are present in the header of each ATM cell and in combination identify the virtual connection to which the cell belongs. Multiplexing and switching of ATM cells in an ATM network is done based on the VPI and VCI values. The VPI 76 and VCI 78 fields of each bandwidth block store VPI and VCI values identifying the virtual connection for transporting the ATM cell corresponding to the bandwidth block. The VPI and VCI values are assigned dynamically at cross-connection time. If the link is a TDM link, a null value is assigned to the VPI and VCI fields. In a specific embodiment, VCI field 78 may be 16 bits wide while VPI field 76 may be either 8 bits or 12 bits wide.

FIG. 5 is a flowchart depicting the steps for provisioning a ATM/TDM cross-connection between a network termination and a subscriber termination. The cross-connection provisioning is generally initiated when a NMS receives a request to cross-connect a particular network termination to a particular subscriber termination (step 80). For example, for the network depicted in FIG. 1, NMS 18 may receive a request to cross-connect network termination 12-a to subscriber termination 14-a.

NMS 18 then determines the network route, including intermediate links and DLCSSs, which have to be provisioned to establish the cross-connection (step 82). For a given network, it is possible that a plurality of network routes may exist between the network termination and the subscriber termination to be cross-connected. For example, for the network in FIG. 1, there are at least three network routes which connect network termination 12-a and subscriber termination 14-a. These include: (1) Network termination 12-a->link 20-a->DLCSS 16-a->link 20-c->DLCSS 16-b->link 20-d->DLCSS 16-c->link 20-f->Subscriber termination 14-a; (2) Network termination 12-a->link 20-a->DLCSS 16-a->link 20-c->DLCSS 16-b->link 20-e->DLCSS 16-c->link 20-f->Subscriber termination 14-a; and (3) Network termination 12-a->link 20-a->DLCSS 16-a->link 20-c->DLCSS 16-b->link 20-h ->DLCSS 16-d->link 20-i >DLCSS 16-c->link 20-f->Subscriber termination 14-a. Where a plurality of network routes exist between the network termination and the subscriber termination, NMS 18 presents the available routes to the network provisioner/ administrator and the network provisioner is then allowed to select a particular network route.

Alternatively, if the network provisioner does not select a particular route, NMS 18 selects a specific network route by executing a "shortest route" algorithm. According to the "shortest route" algorithm, the network route with the smallest number of hops (or links traversed) is chosen. For example, for the network depicted in FIG. 1, routes (1) and (2) are chosen over route (3) which requires one additional hop. If two or more network routes have the same number of hops, the network route with the most available bandwidth is chosen. For example, route (1) is chosen over route (2) if route (1) has higher available bandwidth than route (2). Based on the selected route, NMS 18 then determines the links and DLCSSs to be provisioned to establish the cross-connection. FIG. 6 depicts a subset of the network depicted in FIG. 1, showing the network route to be provisioned to establish a cross-connection between network termination 12-*a* and subscriber termination 14-*a*. The network in FIG. 6 will be used to describe the remaining algorithm steps in FIG. 5.

Next, NMS 18 provisions network DLCSS 16-*a* for the cross-connection (step 84). The details of step 84 are illustrated in the flowchart depicted in FIG. 7. In a specific embodiment, NMS 18 sends a cross-connection message to network DLCSS 16-*a* requesting a connection between link 20-*a* and 20-*c*, along with information that DLCSS 16-*c* is the destination subscriber DLCSS (step 90). Bandwidth requirements for supporting the cross-connection are also communicated to DLCSS 16. Upon receiving the cross-connection request, MCS 26 within DLCSS 16-*a* consults the bandwidth map for link 20-*c* to determine if a bandwidth block has already been allocated for the destination DLCSS, i.e. for DLCSS 16-*c* (step 92). This is usually accomplished by checking the DLCSS identifier field in each of the allocated bandwidth blocks contained in the bandwidth map for link 20-*c*. Allocation of a bandwidth block implies that a corresponding ATM cell has been allocated for the destination DLCSS.

If a bandwidth block has not been previously allocated for the destination DLCSS, a new bandwidth block is allocated (step 100). This in turn allocates a new ATM cell for carrying the network traffic to the destination DLCSS. If a bandwidth block has already been allocated, MCS 26 allocates one or more unallocated DS-0s from the corresponding ATM cell, as indicated by the DS-0 indicators in the pre-allocated bandwidth block, are allocated to the destination DLCSS (step 94). The DS-0 indicators corresponding to the newly allocated DS-0s are modified to reflect the allocation (step 96). MCS 26 then determines if the allocation of DS-0s from the ATM cell corresponding to the pre-allocated bandwidth block was sufficient to satisfy the cross-connection bandwidth requirement (step 98). If additional bandwidth is required, a new bandwidth block and a corresponding ATM cell is allocated to satisfy the bandwidth requirement (step 100).

As previously stated, a new bandwidth block is allocated either if no bandwidth block has been previously allocated for the destination DLCSS, or there were insufficient DS-0s in the pre-allocated block to satisfy the cross-connection request. The DLCSS identifier for the newly allocated bandwidth block is set to the identifier of destination DLCSS 16-*c* (step 102). The requisite number of DS-0s are then allocated to the destination DLCSS and their corresponding DS-0 indicators modified to reflect the allocation (step 106). VPI and VCI values may also assigned to the newly allocated block (step 108). Link 20-*a* is then cross-connected to link 20-*c* via TSI (step 110). If the number of DS-0s required for the cross-connection cannot be allocated by the particular link, the DLCSS notifies NMS 18 that the cross-connection cannot be established for lack of bandwidth.

After network DLCSS 16-*a* establishes a cross-connection between link 20-*a* and 20-*c*, the bandwidth allocation information for link 20-*c* is forwarded to NMS 18 (step 112). This information includes but is not limited to: the bandwidth block number allocated for the connection and the DS-0s allocated for the connection (may be encapsulated in the form of an absolute DS-0 value), and VPI and VCI values assigned to link 20-*c*.

NMS 18 then sends a cross-connection request to the next DLCSS in the network route (step 86). This information usually includes: links that are to be cross-connected, bandwidth allocation information from the previously provisioned DLCSS, and the destination DLCSS identifier. For example, a cross-connection request is sent to intermediate DLCSS 16-*b* along with information including: request for connecting links 20-*c* and 20-*d*, bandwidth allocation data for link 20-*c* received from network DLCSS 16-*a*, and the destination DLCSS 16-*c* identifier.

On receiving the connection request from NMS 18, intermediate DLCSS 16-*b* looks up the bandwidth map for link 20-*c* and updates the bandwidth allocation for link 20-*c* as per bandwidth allocation for that same link received from DLCSS 16-*a*. Since link 20-*c* is managed by both network DLCSS 16-*a* and DLCSS 16-*b*, the bandwidth allocation or bandwidth map information for the link is identical.

DLCSS 16-*b* then follows the same series of steps shown in FIG. 7 for establishing a cross-connection between links 20-*c* and 20-*d*. After DLCSS 16-*b* establishes a cross-connection between links 20-*c* and 20-*d*, the bandwidth allocation information for link 20-*d* is forwarded to NMS 18 (step 112). This information includes but is not limited to: the bandwidth block number allocated for the connection and the DS-0s allocated for the connection (may be encapsulated in the form of an absolute DS-0 value), and VPI and VCI values assigned to link 20-*d*. Step 86 is then repeated for all intermediate DLCSSs in the network route between the network termination and the subscriber termination.

After all the intermediate DLCSSs have been provisioned, NMS 18 then sends a cross-connection request along with bandwidth allocation information for the previous DLCSS to the subscriber DLCSS for establishing the cross-connection (step 88). For example, a connection request is sent by NMS 18 to subscriber DLCSS 16-*c* along with information including: request for connecting links 20-*d* and 20-*f*, bandwidth allocation information for link 20-*d* received from network DLCSS 16-*b*, the destination subscriber terminal 14-*a*, and the destination DLCSS 16-*c* identifier.

Upon receiving the cross-connection request, subscriber DLCSS 14-*a* programs the ATM switch in MCS 26 to cross-connect links 20-*d* and 20-*f* to subscriber termination 14-*a*. This completes the cross-connection between network termination 12-*a* and subscriber termination 14-*a*. Since every DS-0 in an ATM cell has a destination which is known to be the same DLCSS, the ATM cell is passed directly to the destination DLCSS without need for further TDM switching at the DS-0 level. In this manner, TDM traffic encapsulated in ATM cells may be transported from the network termination to the subscriber termination without having to perform TDM switching at the intermediate DLCSSs (or nodes).

The present invention presents several advantages over conventional techniques for cross-connecting TDM networks and ATM networks. Since each DLCSS in the network route between the network termination and the subscriber termination keeps track of the destination subscriber DLCSS, and further since each ATM cell is assigned to a particular destination, i.e. all the DS-0s in the cell have a common destination DLCSS, the ATM cell carrying the TDM traffic does not need to be switched at intermediate nodes or DLCSSs. This reduces the switching time required by conventional switches for switching TDM traffic in ATM networks. Reduced switching time translates to faster services being provided to subscribers. Further, the present invention discloses a simple and efficient method and system for provisioning ATM/TDM cross-connections via a network managing station. The station also allows for efficient bandwidth management for the ATM/TDM cross-connection. Several other advantages of the present invention will be apparent to one of ordinary skill in the art.

Although the invention has been explained with reference to specific embodiments, other embodiments will be evident to those of ordinary skill in the art. It is therefore not intended that this invention be limited except as indicated by the appended claims.

Conclusion

A method and system for establishing cross-connections between TDM and ATM networks and providing switching and bandwidth management facilities for the ATM/TDM cross-connection in a digital loop carrier (DLC) network. TDM traffic is encapsulated in ATM cells and transported from network terminations to subscriber terminations in a digital loop via a plurality of digital loop carrier switching systems (DLCSSs). The DLCSSs are configured such that TDM traffic encapsulated in ATM cells may be transported from the network termination to the subscriber termination without having to perform TDM switching at the intermediate DLCSSs.

Although specific embodiments of the invention have been described, various modifications, alterations, alternative constructions, and equivalents are also encompassed within the scope of this invention. For example, the described invention is not restricted to operation within certain specified computer environments, but is free to operate within a plurality of computer environments. Additionally, although the present invention has been described using a particular series of transactions between the various network components, it should be apparent to those skilled in the art that the scope of the present invention is not limited to the described series of transactions.

While the present invention has been described using a particular combination of hardware and software, it should be recognized that other combinations of hardware and software are also within the scope of the present invention. For example, the functions performed by the NMS and the DLCSS may be performed by software modules executed by processors in the NMS and DLCSS, respectively. Alternatively, the present invention may be implemented only in hardware or only in software, or a combination of hardware and software or in combinations with other hardware and software elements.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. In a digital carrier loop network comprising a plurality of switching nodes, a network termination, and a subscriber termination coupled to each other via communication links, a method for establishing a cross-connection between the network termination and the subscriber termination for transporting TDM traffic from the network termination to the subscriber termination, the method comprising:

determining a network path between the network termination and the subscriber termination comprising a series of switching nodes, the series of switching nodes including a first switching node coupled to the network termination, a last switching node coupled to the subscriber termination and intermediate nodes between the first switching node and the last switching node;

determining bandwidth requirements for supporting the cross-connection between the network termination and the subscriber termination;

configuring a first data structure at the first switching node based on the bandwidth requirements, the first data structure storing switching and bandwidth allocation information for connecting the first switching node to the network termination and to an intermediate switching node coupled with the first switching node, the switching information including last switching node identification information;

configuring an intermediate data structure at each of the intermediate switching nodes based on the bandwidth requirements and on the information stored in the data structures of the previous switching node in the series of switching nodes, the intermediate data structure storing switching and bandwidth allocation information for connecting the intermediate switching node to the previous switching node and to the next switching node in the series of switching nodes, the switching information including last switching node identification information;

configuring a last data structure at the last switching node based on the bandwidth requirements and on the information stored in the data structure of an intermediate switching node coupled with the last switching node, the last data structure storing switching and bandwidth allocation information for connecting the last switching node to the switching node coupled with the second switching node and to the subscriber termination;

encapsulating the TDM traffic in ATM cells; and transporting the ATM cells between the network termination and the subscriber termination via the series of switching nodes using the information stored in the data structures at the switching nodes such that the ATM cells are switched at the switching nodes using ATM switching while bypassing TDM switching.

2. The method of claim 1 wherein determining the network path between the network termination and the subscriber termination comprises:

determining all possible network paths between the network termination and the subscriber termination;

determining number of switching nodes in each of said possible network paths; and selecting the network path from said possible network paths having the least number of switching nodes.

3. The method of claim 2 wherein selecting the network path further comprises selecting the network path having the highest available bandwidth if more than one network paths have the same number of switching nodes.

4. The method of claim 1 wherein determining the bandwidth requirements comprises:
   providing a network managing station coupled with the first switching node; and
   receiving the bandwidth requirements for the cross-connection at the network managing station.

5. The method of claim 1 wherein each data structure configured at the first, intermediate, and last switching nodes includes at least one bandwidth block corresponding to an ATM cell to be transported via the switching node, the method further comprising:
   storing the switching and bandwidth allocation information for the switching node in the bandwidth allocation block, the switching information including the last switching node identification information; and
   performing switching and bandwidth allocation of the ATM cell according to the switching and mapping information stored in the bandwidth block, wherein the last switching node identification information identifies the switching node to which the ATM cell is to be transported.

6. The method of claim 5 wherein configuring the data structure at each of the switching nodes comprises:
   identifying a number of bandwidth blocks for supporting the cross-connection based on the bandwidth requirements of the cross-connection;
   for each identified bandwidth block, determining the bandwidth allocation information, the bandwidth allocation information indicative of bandwidth to be allocated for the cross-connection from the ATM cell corresponding to the bandwidth block;
   for each identified bandwidth block, determining a virtual path identifier and a virtual channel identifier value for performing ATM switching at the switching node; and
   for each identified bandwidth block, storing the bandwidth allocation information, the virtual path identifier value and the virtual channel identifier values in the bandwidth block.

7. In a digital carrier loop network comprising a plurality of switching nodes, a network managing station, a network termination, and a subscriber termination coupled to each other via communication links, a system for establishing a cross-connection between the network termination and the subscriber terminal for transporting TDM traffic from the network terminal to the subscriber terminal, the system comprising:
   the network managing station configured to determine a network path between the network termination and the subscriber termination for the cross-connection, the network path comprising a series of switching nodes coupled with the network termination and the subscriber termination, the series including a first switching node coupled with the network termination, a last switching node coupled with the subscriber termination, and intermediate switching nodes between the first and last switching nodes, wherein each of the switching nodes including a memory and a processor;
   the network managing station further configured to determine the bandwidth requirements for the cross-connection and to communicate the bandwidth requirements to the series of switching nodes in the network path;
   the first switching node is configured to determine switching and bandwidth allocation information, based on the bandwidth requirements, for connecting the first switching node to the network termination and to an intermediate switching node coupled with the first switching node, the switching and bandwidth allocation information being stored in a first data structure in the memory of the first switching node, the switching information including last switching node identification information;
   each of the intermediate switching nodes is configured to determine switching and bandwidth allocation information, based on the bandwidth requirements, for connecting the intermediate switching node to the previous switching node and to the next switching node in the series of switching nodes, the switching and bandwidth allocation information being stored in an intermediate data structure in the memory of the intermediate switching node, the switching information including last switching node identification information;
   the last switching node is configured to determine switching and bandwidth allocation information, based on the bandwidth requirements, for connecting the last switching node to the subscriber termination and to an intermediate switching node coupled with the last switching node, the switching and bandwidth allocation information being stored in a last data structure in the memory of the last switching node; and
   the switching nodes are configured to transport the ATM cells, encapsulating the TDM traffic, from the network termination to the subscriber termination using the switching and bandwidth allocation information contained in the data structures stored in the memories of the switching nodes such that the ATM cells are switched at the switching nodes using ATM switching while bypassing TDM switching.

8. The system of claim 7 wherein in order to determine the network path, the network managing station is configured to determine all possible network paths between the network termination and the subscriber termination, to determine number of switching nodes in each of said possible network paths, and to select the network path from the possible network paths by selecting the network path having the least number of switching nodes.

9. The system of claim 8 wherein the network managing station is further configured to select the network path having the highest available bandwidth if more than one network paths have the same number of switching nodes.

10. The system of claim 7 wherein each data structure stored in the memories of the first, intermediate, and last switching nodes contains at least one bandwidth block corresponding to an ATM cell to be transported via the switching node, the bandwidth block storing the switching and bandwidth allocation information for the switching node, the information defining the bandwidth allocation and switching characteristics for the ATM cell, the switching information including the last switching node identification information identifying the switching node to which the ATM cell is to be transported.

11. The system of claim 10 wherein each switching node is further configured to identify a number of bandwidth blocks for supporting the cross-connection based on the bandwidth requirements of the cross-connection, for each identified bandwidth block each switching node is configured to determine the bandwidth allocation information, the bandwidth allocation information indicative of bandwidth to be allocated for the cross-connection in the ATM cell corresponding to the bandwidth block, to determine a virtual path identifier and a virtual channel identifier value for performing ATM switching at the switching node, the switching node configured to store the bandwidth allocation information, the virtual path identifier value, and the virtual channel identifier value in the bandwidth block.

12. In a digital carrier loop network comprising a plurality of switching nodes, a network termination, and a subscriber termination coupled to each other via communication links, a computer program product for establishing a cross-connection between the network termination and the subscriber termination for transporting TDM traffic from the network termination to the subscriber termination, the product comprising:

code for determining a network path between the network termination and the subscriber termination comprising a series of switching nodes, the series of switching nodes including a first switching node coupled to the network termination, a last switching node coupled to the subscriber termination and intermediate nodes between the first switching node and the last switching node;

code for determining bandwidth requirements for supporting the cross-connection between the network termination and the subscriber termination;

code for configuring a first data structure at the first switching node based on the bandwidth requirements, the first data structure storing switching and bandwidth allocation information for connecting the first switching node to the network termination and to an intermediate switching node coupled with the first switching node, the switching information including last switching node identification information;

code for configuring an intermediate data structure at each of the intermediate switching nodes based on the bandwidth requirements and on the information stored in the data structures of the previous switching node in the series of switching nodes, the intermediate data structure storing switching and bandwidth allocation information for connecting the intermediate switching node to the previous switching node and to the next switching node in the series of switching nodes, the switching information including last switching node identification information;

code for configuring a last data structure at the last switching node based on the bandwidth requirements and on the information stored in the data structure of an intermediate switching node coupled with the last switching node, the last data structure storing switching and bandwidth allocation information for connecting the last switching node to the switching node coupled with the second switching node and to the subscriber termination;

code for encapsulating the TDM traffic in ATM cells;

code for transporting the ATM cells between the network termination and the subscriber termination via the series of switching nodes using the information stored in the data structures at the switching nodes such that the ATM cells are switched at the switching nodes using ATM switching while bypassing TDM switching; and a computer-readable storage medium for storing the codes.

\* \* \* \* \*